United States Patent
Willems et al.

(10) Patent No.: US 8,875,842 B2
(45) Date of Patent: Nov. 4, 2014

(54) CAP FOR A GREASE NIPPLE

(75) Inventors: Guus Willems, Utrecht (NL); Gustavo Sabogal, Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 302 days.

(21) Appl. No.: 13/393,546

(22) PCT Filed: Sep. 8, 2009

(86) PCT No.: PCT/EP2009/006522
§ 371 (c)(1),
(2), (4) Date: May 11, 2012

(87) PCT Pub. No.: WO2011/029453
PCT Pub. Date: Mar. 17, 2011

(65) Prior Publication Data
US 2012/0217095 A1  Aug. 30, 2012

(51) Int. Cl.
*F16N 13/22* (2006.01)
*F16L 55/10* (2006.01)
*B65D 25/00* (2006.01)
*F16N 21/06* (2006.01)

(52) U.S. Cl.
CPC .................................... *F16N 21/06* (2013.01)
USPC .......................... 184/88.2; 138/89.1; 220/744

(58) Field of Classification Search
USPC ................. 184/88.1, 105.3, 88.2; 137/381; 138/89.1, 89.2, 89.4; 220/375, 744; 215/306
See application file for complete search history.

(56) References Cited

U.S. PATENT DOCUMENTS

| 2,599,472 | A |   | 6/1952  | Miller |
|-----------|---|---|---------|--------|
| 2,680,497 | A | * | 6/1954  | Miller ........................ 184/88.2 |
| 2,971,045 | A | * | 2/1961  | August ......................... 429/54 |
| 3,147,824 | A |   | 9/1964  | Henderson |
| 3,974,938 | A | * | 8/1976  | Steadman .................... 220/266 |
| 4,307,748 | A | * | 12/1981 | Mathias ....................... 137/381 |
| 4,318,495 | A | * | 3/1982  | Wood .......................... 220/375 |
| 4,706,841 | A | * | 11/1987 | Grajek ......................... 220/375 |
| 4,842,304 | A |   | 6/1989  | Jones |
| 5,195,561 | A | * | 3/1993  | Wilson ........................ 138/89.2 |
| 5,241,982 | A |   | 9/1993  | Taylor |
| 6,227,399 | B1 | * | 5/2001 | Angus et al. ................. 220/375 |
| 7,954,515 | B2 | * | 6/2011 | Gerst ............................. 138/89 |
| 2005/0023238 | A1 | * | 2/2005 | Wong ............................ 215/252 |
| 2010/0147629 | A1 | * | 6/2010 | Joss et al. .................... 184/105.3 |

FOREIGN PATENT DOCUMENTS

DE   202004019499 U1   4/2005

* cited by examiner

*Primary Examiner* — William E Dondero
*Assistant Examiner* — Minh Truong
(74) *Attorney, Agent, or Firm* — Bryan Peckjian; SKF USA Inc. Patent Department

(57) ABSTRACT

The present invention relates to a protective cap (20) for a grease nipple. The protective cap comprises a removable cap portion (22) with an internal cavity (23) that is shaped to fit over and enclose a nipple head of the grease nipple, and comprises an attachment portion (24) that is adapted to remain attached to the grease nipple when the cap portion is removed. According to the invention, the attachment portion (24) of the protective cap (20) comprises a plurality of through holes (26, 27, 28, 29) each of which has a unique diameter.

17 Claims, 3 Drawing Sheets

CAP FOR A GREASE NIPPLE

CROSS-REFERENCE

This application is the US national stage of International Application No. PCT/EP2009/006522 filed on Sep. 8, 2009.

FIELD OF THE INVENTION

The present invention relates to a protective cap for a grease nipple or equivalent lubrication point.

BACKGROUND TO THE INVENTION

Grease nipples are fittings provided on industrial machines that enable additional grease to be supplied to a lubricated moving part of the machine, such as a rolling element bearing. The nipples comprise a nipple head, to which a corresponding grease gun is attached, and a nipple body with a shank that is e.g. screwed into the machine part to be lubricated. To prevent contaminants from clogging up a grease nipple and to prevent their entry into the moving machine part, the nipple head is generally kept covered by a protective cap. In one commercially available type, a first part of the cap fits over and encloses the nipple head, and is removable in order to allow lubrication via the nipple head, while a second part of the cap remains attached to the grease nipple when the nipple head is uncovered. Commonly, the second part of the cap has a hole through which the shank of the grease nipple is inserted, thereby securing the cap to the nipple and preventing the cap from getting lost.

Grease nipples are available in a range of sizes. The diameter of the nipple head can vary, depending on the application and on the size of the grease gun to be used. Furthermore, grease nipples with the same head diameter are available with various shank diameters. Therefore, commercially available caps of the above-described type are usually supplied in sets comprising several pieces in a range of dimensions, whereby the first part of the cap is designed for a particular size of nipple head and the second part of the cap is designed for a particular shank diameter.

Consequently, there is room for improvement in terms of providing a protective cap that is easy to match to various sizes of grease nipple and which lessens the need to carry caps that do not have the right dimensions.

SUMMARY OF THE INVENTION

The aforementioned improvement is realized by means of the present invention, which relates to a protective cap for a grease nipple, the protective cap comprising a cap portion with an internal cavity that is shaped to fit over and enclose a nipple head of the grease nipple, and comprising an attachment portion with a first through hole that is attachable around a second part of the grease nipple, whereby the cap portion and the attachment portion of the protective cap are connected by a flexible tether. According to the invention, the attachment portion of the protective cap comprises at least a second through hole with a diameter different from a diameter of the first through hole.

In many applications, the second part of the grease nipple to which the attachment portion of the cap is attached is a shank of the grease nipple. The shank can be threaded or unthreaded. Consequently, one of the through holes in the attachment portion has a diameter that is adapted for a first shank diameter, while another of the through holes has a diameter that is adapted for a second shank diameter. A protective cap according to the invention is thus attachable to grease nipples with a particular nipple head size and different shank diameters.

When the grease nipple has a bulbous head, the attachment portion can also be attached around a corresponding neck part of the grease nipple. Thus, in a preferred embodiment of the invention, one of the through holes in the attachment portion has a diameter that is slightly smaller than a diameter of the grease nipple head, so that this through hole can be stretched over the nipple head, to attach the cap around the neck. Suitably, at least the attachment portion of the protective cap is made from a polymer material that readily allows elastic deformation.

In some embodiments of a protective cap according to the invention, the attachment portion comprises at least a third and a fourth through hole, each having a diameter different from the first and second diameters. This further increases the usability of the inventive cap. A greater number of through holes is also possible. In a particularly advantageous embodiment, the diameters of the through holes are adapted to receive the most common nipple shank diameters for a particular type of grease nipple, thereby enhancing the universal nature of the inventive cap.

In one embodiment of the invention, the attachment portion and the cap portion of the protective cap are manufactured separately and are joined together by means of the flexible tether. In a preferred embodiment, the attachment portion, the flexible tether and the cap portion are formed as a single piece, for example, in an injection moulding process. The advantage of this embodiment is a more economical and straightforward manufacturing process.

In a further development of the invention, the cap portion comprises at least a first and a second internal cavity of different dimensions, whereby the first internal cavity is shaped to fit over and enclose a first size of nipple head and the second internal cavity is shaped to fit over and enclose a second size of nipple head. A greater number of internal cavities is also possible. The advantage of this development is that the inventive cap can be used in combination with grease nipples of different head sizes and different shank diameters, thereby optimizing the cap's universal applicability.

In a still further development of the invention, the protective cap has means for affixing an information label. The cap portion and/or the flexible tether and/or the attachment portion of the protective cap can comprise means for affixing an information label. The information label can simply be an adhesive label that is affixed to an available space on one or more parts of the protective cap. Alternatively, the cap portion and/or the flexible tether and/or the attachment portion can be provided with e.g. a transparent pocket into which the information label is inserted. One advantage of this development is that the protective cap can be provided with information that prevents maintenance errors.

In a still further development of the invention, at least a part of the protective cap is provided with a visual and/or a tactile identifier. In one embodiment, the visual and/or tactile identifier is based on a particular size of nipple head, making it easy to select the required protective cap. Alternatively or additionally, the identifier can be based on a required type of grease or on a corresponding identifier on a particular type of grease gun. For example, the cap portion may have one or more colour codes corresponding to the one or more nipple head sizes which the cap is adapted to fit, while the attachment portion has a colour or a texturized surface which indicates the correct type of grease to be used. Many other types of visual and tactile identifiers are possible. Again, the provision of an identifier enhances maintenance procedures and helps prevent errors.

Thus, a protective cap according to the invention has several advantages, especially in industrial environments where the machinery is provided with grease nipples of different sizes. In the case of conventional caps that fit only one size of nipple, it is common practice to purchase sets of caps in a range of head diameter and shank diameter combinations. These sets will likely include individual combinations of dimensions that are not needed. Waste is therefore reduced by means of a protective cap that fits more than one size of grease nipple.

A protective cap according to the invention has further advantages, which will become apparent from the following detailed description and accompanying figures.

DESCRIPTION OF THE FIGURES

In the following, the invention is described with reference to the accompanying drawings, in which:

FIG. 2b shows a cross-sectional view of the same protective cap, taken through line X-X' in FIG. 2a.

DETAILED DESCRIPTION

Figure 1:
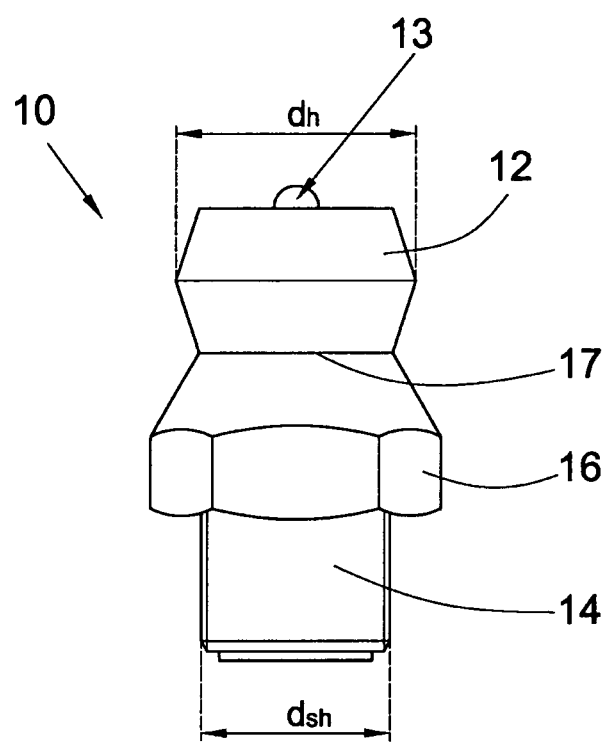
FIG. 1 shows a front view of an example of a grease nipple.

An example of a typical grease nipple is illustrated in FIG. 1. The grease nipple 10 comprises a head 12 with a spring-loaded ball 13, such that the ball 13 can be depressed to allow grease to be dispensed into the nipple 10 when a suitable grease gun is attached. The nipple further comprises a shank 14 that is connected to a machine part to be lubricated. In this example, the shank 14 is threaded and will be screwed into the machine part; for example, into a housing of a rolling element bearing. The nipple head 12 has a particular diameter $d_h$ and the nipple shank 14 has a particular diameter $d_{sh}$. Common head diameters include 6 mm, 6.5 mm, 9.2 mm and 11.5 mm, while common shank diameters include 6 mm, 8 mm, and 10 mm corresponding to thread diameters M6, M8 and M10. The nipple 10 further comprises a collar 16, whereby the collar 16 separates the head 12 from the shank 14 and has a larger diameter than the head diameter $d_h$ and the shank diameter $d_{sh}$. Between the collar 16 and the nipple head 12, a neck 17 is formed. The neck has a smaller diameter than the head diameter $d_h$ and allows a grease gun nozzle to be connected around the nipple head 12. In this example, the collar 16 has a portion that tapers towards the neck 17.

To prevent contaminants entering the grease nipple, it is common practice to keep the nipple head covered with a removable protective cap, part of which remains attached to the grease nipple when the head is uncovered, so that the cap is not dropped or lost. Conventional protective caps of this type are suitable for use on grease nipples with only one combination of head diameter $d_h$ and the shank diameter $d_{sh}$. A protective cap according to the invention, by contrast, can be used on more than one combination of head and shank diameter. One embodiment of the inventive cap is shown in a bottom view in FIG. 2a and in a cross-sectional view in FIG. 2b, taken through line X-X' on FIG. 2a.

Also making reference to FIG. 1, the protective cap 20 comprises a cap portion 22 with an internal cavity 23 that is shaped to fit over and tightly enclose a nipple head with a particular head diameter $d_h$. Suitably, the internal cavity has a depth that is sufficient to cover a corresponding dimension of the nipple head 12. The protective cap 20 further comprises an attachment portion 24 that is adapted to remain attached to the grease nipple 10. The cap portion 22 and the attachment portion 24 are connected by a flexible tether 25. In the depicted embodiment, the flexible tether is a narrow strip of flexible material that is bent upwards and towards the nipple head 12 after the attachment portion 24 has been attached to the nipple shank 14. The flexible tether 25 is sufficiently long to then enable the cap portion 22 to be fitted over the nipple head 12.

According to the invention, the attachment portion 24 incorporates a plurality of through holes, whereby each through hole has a unique diameter. In the embodiment depicted in FIGS. 2a and 2b, the attachment portion comprises first, second, third and fourth through holes 26, 27, 28, 29 having corresponding diameters $d_1, d_2, d_3, d_4$.

In one example of this embodiment, the cap portion 22 is adapted to fit a grease nipple of the type shown in FIG. 1 with a head diameter $d_h$ of 6 mm. Further, the first through hole 26 has a diameter $d_1$ of 5.6 mm; the second through hole 27 has a diameter $d_2$ of 8 mm; the third through hole 28 has a diameter $d_3$ of 9.9 mm and the fourth through hole 29 has a diameter $d_4$ of 13.2 mm.

Taking as an example a grease nipple with a head diameter of 6 mm and a threaded shank of M6 diameter, the attachment portion 24 can therefore be attached to the grease nipple 10 by screwing the threaded shank 14 through the first through hole 26. Alternatively, the first through hole 26 can be stretched over the nipple head 12, such that the protective cap 20 is attached around the grease nipple 10 at the neck 17. Suitably, the protective cap 20 is made from a polymer material such as nylon plastic, which will allow this slight stretching of the through hole. Nylon plastic will also allow the required bending of the flexible tether 25 and will also enable the cap portion 22 to be stretched over the nipple head, if necessary.

Taking as a further example a grease nipple with the same head diameter of 6 mm but with a different threaded shank of M10 diameter, the protective cap 20 can be attached to the grease nipple 10 by screwing the threaded shank 14 through the third through hole 28. A through hole diameter $d_3$ of 9.9 mm is also suitable for a grease nipple with a G1/8 (or R1/8) shank.

Figure 2A:
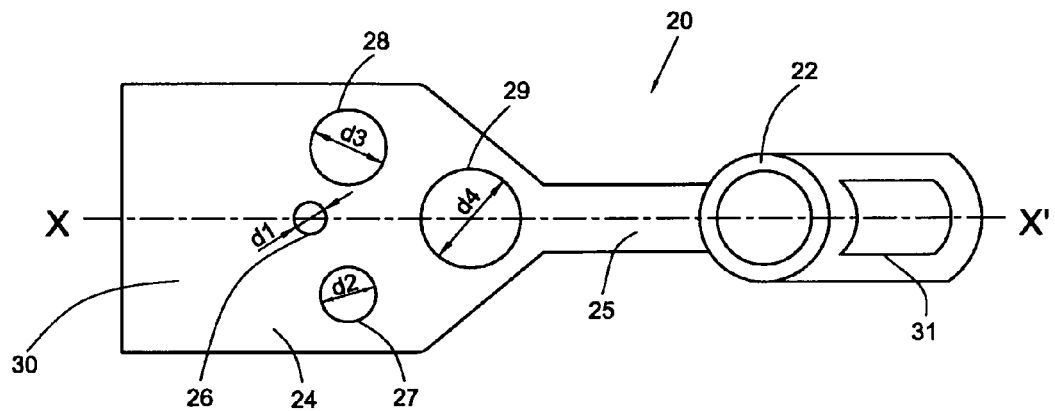
FIG. 2a shows a bottom view of one embodiment of a protective cap according the invention.
Figure 2B:
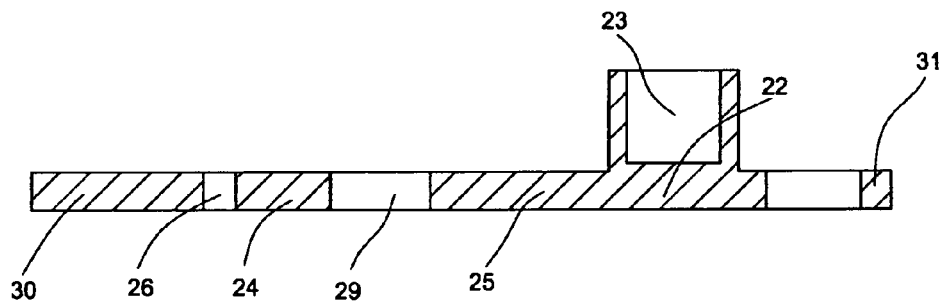

In the given example of the embodiment of FIGS. 2a and 2b, the second through hole 27 of the attachment portion 24 has a diameter $d_2$ that is suitable for a grease nipple with an M8 threaded shank and the fourth through hole 29 has a diameter $d_4$ that is suitable for a grease nipple with a G1/4 (or R1/4) threaded shank. Thus, a protective cap according to the invention is not restricted to grease nipples with a single shank diameter.

Advantageously, the attachment portion 24 is provided with through hole diameters that correspond to the most common shank diameters of a grease nipple with a particular head diameter. The number of through holes can also be adapted accordingly. In some examples, an attachment portion provided with only two through holes is sufficient, when two shank diameters are widely prevalent. In other examples, the attachment portion is provided with five or more through holes with unique diameters as needed.

The through holes 26, 27, 28, 29 can be arranged on the attachment portion 24 in any suitable manner. In one example, the through holes are arranged in a straight line in the longitudinal direction of the cap 20. Suitably, the through holes may be arranged in ascending order of diameter, with the smallest through hole placed closest to the cap portion 22.

This linear arrangement enables the width of the cap to be minimized. In a further example, the through holes are arranged in a semi-circular fashion, such that a centre of each through hole is equidistant to a centre of the cap portion 22. This semi-circular arrangement requires less length, but more width. A balance between the length and width requirements of the attachment portion 24 can be obtained by arranging the through holes on a more acute curve or by arranging them in rows, as shown in FIG. 2a. Many configurations are possible.

Figure 2C:
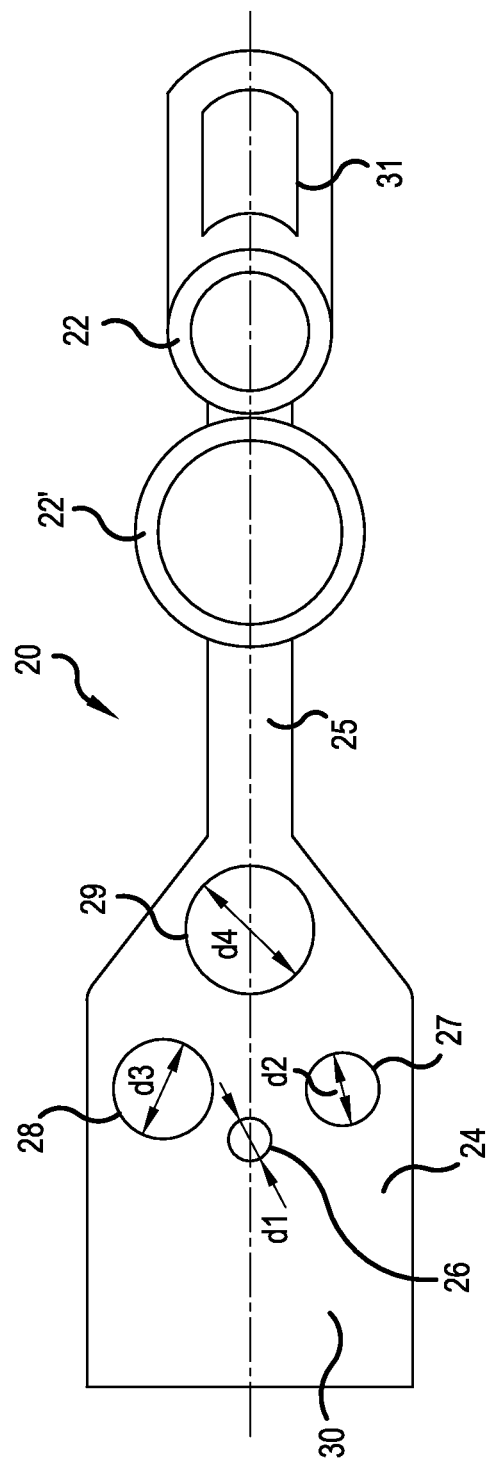
FIG. 2c shows a bottom view of another embodiment of a protective cap according the invention.

In a further development of the invention illustrated in FIG. 2c, the cap portion 22 includes a second cap portion 22', and each cap portion 22, 22' is provided with an internal cavity 23. Each cavity has a unique set of dimensions that is adapted to fit a particular size of grease nipple head 12, meaning that the protective cap can be used on grease nipples with a range of different head sizes and shank diameters. As with the through holes 26, 27, 28, 29, the more than one internal cavity can be arranged in a straight line in the longitudinal direction of the cap or in any other suitable arrangement.

The protective cap according to the invention has been described with reference to the type of grease nipple illustrated in FIG. 1, which is a straight nipple with a bulbous head. The inventive cap may also be used on grease nipples with a button head and on grease nipples where the nipple head is angled in relation to the shank.

A common application of grease nipples is to enable the relubrication of rolling element bearings. To ensure that a bearing reaches its expected service life, it is important that the bearing is lubricated with the right grease and according to the relubrication intervals prescribed by the bearing manufacturer. In machinery plants, it is therefore common practice to provide the lubrication points with information tags on which data such as the required grease type, the amount to be dispensed, the relubrication interval and the date of the last relubrication can be recorded. Often, such information tags are simply attached to a grease nipple.

In a further development of the invention, the protective cap comprises means for affixing an information label on which data such as the above-described can be recorded.

In one embodiment, as shown in FIG. 2a, the attachment portion 24 of the protective cap 20 comprises a label section 30. This label section is an elongation, which extends from a first section of the attachment portion that comprises the through holes 26, 27, 28, 29. In effect, the label section 30 is a space on which an information label can be e.g. adhesively affixed. In an alternative embodiment, a transparent pocket is provided on the label section 30, into which an information label can be inserted. It is also possible to provide a label section on the cap portion 22 and/or on the flexible tether 25. For example, in the embodiment of FIGS. 2a and 2b, the cap portion 22 has an extension 31, to enable the cap to be easily removed by hand. In some embodiments of the inventive cap, this extension 31 of the cap portion 22 is large enough to accommodate an information label on which all necessary data can be recorded. In a further example, "unchanging" data such as the bearing type, prescribed grease, prescribed relubrication interval and the prescribed amount of grease could be recorded on a label affixed to the attachment portion 24, while "changing" data such as the date of the last relubrication could be provided on a label affixed to the cap portion 22. Many further possibilities exist.

A number of aspects/embodiments of the invention have been described. It is to be understood that each aspect/embodiment may be combined with any other aspect/embodiment. The invention may thus be varied within the scope of the accompanying patent claims.

REFERENCE NUMERALS

FIG. 1, showing a front view of an example of grease nipple.
10 grease nipple
12 nipple head
13 spring-loaded ball
14 threaded shank
16 collar
17 neck
$d_h$ nipple head diameter
$d_{sh}$ nipple shank diameter FIGS. 2a and 2b, respectively showing a bottom view and a cross-sectional view of one embodiment of a protective cap according to the invention.
20 protective cap
22 cap portion
23 internal cavity
24 attachment portion
25 flexible tether
26 first through hole
27 second through hole
28 third through hole
29 fourth through hole
30 label section
31 extension of cap portion
$d_1$ diameter of first through hole
$d_2$ diameter of second through hole
$d_3$ diameter of third through hole
$d_4$ diameter of fourth through hole

The invention claimed is:

1. A protective cap for a grease nipple, the protective cap comprising:
   a cap portion having at least one internal cavity that is shaped to fit over and enclose a nipple head of the grease nipple,
   an attachment portion including a first circular through hole that is attachable around a second part of the grease nipple,
   a flexible tether that connects the cap portion to the attachment portion, and wherein
   the attachment portion has at least a second circular through hole, the second through hole having a diameter $d_2$ that is different from a diameter $d_1$ of the first through hole.

2. A protective cap according to claim 1, wherein the attachment portion further comprises at least a third and a fourth circular through hole having corresponding diameters $d_3$ and $d_4$, each of which differs from the diameters $d_1$ and $d_2$ of the first and second circular through holes respectively.

3. A protective cap according to claim 1, wherein one of the circular through holes has a diameter that is slightly smaller than a diameter of the nipple head.

4. A protective cap according to claim 1, wherein one of the circular through holes has a diameter that is adapted to receive a threaded shank of the grease nipple.

5. A protective cap according to claim 1, wherein the diameters of the circular through holes are related to a diameter of the nipple head.

6. A protective cap according to claim 1, wherein the cap portion comprises more than one internal cavity and each cavity has a unique size.

7. A protective cap according to claim 1, wherein the attachment portion, the flexible tether and the cap portion are formed as a single piece.

8. A protective cap according to claim 1, wherein one or more of the attachment portion, the cap portion and the flexible tether comprises means for affixing an information label.

9. A protective cap according to claim 1, wherein at least a part of the protective cap is provided with a visual or tactile identifier.

10. A protective cap according to claim 9, wherein the visual identifier is a colour coding.

11. A protective cap according to claim 1, wherein the first circular through hole is located entirely on the attachment portion and wherein the second circular through hole is located entirely on the attachment portion.

12. A protective cap for a grease nipple, the protective cap comprising:
   a cap portion having at least one internal cavity configured to fit over and enclose a nipple head of a first grease nipple,
   a flexible tether having a first end connected to the cap portion and a second end and a length from the first end to the second end, a width perpendicular to the length, and a thickness perpendicular to the width and to the length, the thickness being less than the length and less than the width, and
   an attachment portion connected to the second end of the flexible tether, the attachment portion including a first circular through hole having a periphery, the periphery of the first circular through hole being located entirely on the attachment portion and the first circular through hole having a first maximum width, and the attachment portion including a second circular through hole having a periphery, the periphery of the second circular through hole being located entirely on the attachment portion, and the second circular through hole having a second maximum width different than the first maximum width.

13. A protective cap according to claim 12, wherein the attachment portion includes a third through hole having a periphery located entirely on the attachment portion, the third through hole having a third maximum width different than the first maximum width and different than the second maximum width, and wherein the attachment portion includes a fourth through hole having a periphery located entirely on the attachment portion, the fourth through hole having a fourth maximum width different than the first maximum width and different than the second maximum width and different than the third maximum width.

14. A protective cap according to claim 12, wherein the first circular through hole lies on a longitudinal centerline of the protective cap and the second circular through hole does not lie on the longitudinal centerline of the protective cap.

15. A protective cap according to claim 12, wherein the first maximum width comprises a first diameter and wherein the second maximum width comprises a second diameter.

16. A protective cap according to claim 12, wherein the at least one internal cavity comprises a first internal cavity having a first size and being configured to fit over and enclose the nipple head of the first grease nipple and a second internal cavity having a second size different than the first size and being configured to fit over and enclose a nipple head of a second grease nipple.

17. A protective cap for a grease nipple, the protective cap comprising:
   a cap portion having at least one internal cavity configured to fit over and enclose a nipple head of a first grease nipple,
   a flexible tether having a first end connected to the cap portion and a second end and a length from the first end to the second end, a width perpendicular to the length, and a thickness perpendicular to the width and to the length, the thickness being less than the length and less than the width, and
   means for attaching the cap portion and the flexible tether to a grease nipple, the means for attaching being connected to the second end of the flexible tether wherein the means for attaching comprises a body of material having a first circular through hole configured to attach to a part of the grease nipple, the first circular through hole having a first maximum width, and wherein the means for attaching further includes a second circular though hole having a second maximum width different than the first maximum width.

* * * * *